(12) United States Patent
Yamaguchi et al.

(10) Patent No.: US 11,409,281 B2
(45) Date of Patent: Aug. 9, 2022

(54) INFORMATION PROCESSING METHOD FOR DETERMINING DIFFICULT AREA IN WHICH TRAVEL OF VEHICLE BY AUTOMATIC DRIVING IS DIFFICULT, INFORMATION PROCESSING APPARATUS, SYSTEM, AND STORAGE MEDIUM

(71) Applicant: Panasonic Intellectual Property Corporation of America, Torrance, CA (US)

(72) Inventors: Takuya Yamaguchi, Osaka (JP); Naoyuki Harada, Osaka (JP); Shuhei Matsui, Osaka (JP); Hideo Umetani, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 54 days.

(21) Appl. No.: 15/982,101

(22) Filed: May 17, 2018

(65) Prior Publication Data

US 2018/0348755 A1 Dec. 6, 2018

(30) Foreign Application Priority Data

May 31, 2017 (JP) .............................. JP2017-108016
Feb. 5, 2018 (JP) .............................. JP2018-018460

(51) Int. Cl.
*G05D 1/00* (2006.01)
*G08G 1/01* (2006.01)
(Continued)

(52) U.S. Cl.
CPC ......... *G05D 1/0061* (2013.01); *G05D 1/0214* (2013.01); *G08G 1/0112* (2013.01);
(Continued)

(58) Field of Classification Search
CPC ............... G05D 1/0061; G05D 1/0214; G08G 1/096791; G08G 1/0133; G08G 1/0129; G08G 1/0112; H04W 4/46
See application file for complete search history.

(56) References Cited

U.S. PATENT DOCUMENTS 9,123,152 B1 * 9/2015 Chatham ................. H04L 67/01
10,042,359 B1 * 8/2018 Konrardy .............. B60R 25/102
(Continued)

FOREIGN PATENT DOCUMENTS

JP 2016-028927 3/2016
WO 2016/013574 A1 1/2016
(Continued)

OTHER PUBLICATIONS

The Extended European Search Report dated Oct. 23, 2018 for the related European Patent Application No. 18171799.2.

*Primary Examiner* — Jess Whittington
*Assistant Examiner* — Brian E Yang
(74) *Attorney, Agent, or Firm* — Greenblum & Bernstein, P.L.C.

(57) ABSTRACT

An information processing method includes: acquiring, from one or more first vehicles, manual driving information for each of the first vehicles; acquiring, from one or more second vehicles, automatic driving information for each of the second vehicles; calculating, for each area, a first value of a driving parameter correlated with a degree of difficulty in driving according to the manual driving information; calculating, for the each area, a second value of the driving parameter according to the automatic driving information; comparing the first value with the second value for the each area to determine at least one difficult area in which travel of a vehicle by automatic driving is difficult; and creating difficult area information.

13 Claims, 6 Drawing Sheets

(51) Int. Cl.
*H04W 4/46* (2018.01)
*G05D 1/02* (2020.01)
*G08G 1/0967* (2006.01)

(52) U.S. Cl.
CPC ......... *G08G 1/0129* (2013.01); *G08G 1/0133* (2013.01); *G08G 1/096791* (2013.01); *H04W 4/46* (2018.02)

(56) References Cited

U.S. PATENT DOCUMENTS

| | | | | |
|---|---|---|---|---|
| 2014/0129073 | A1* | 5/2014 | Ferguson | B62D 15/025 |
| | | | | 701/23 |
| 2017/0166222 | A1* | 6/2017 | James | G05D 1/0088 |
| 2017/0203770 | A1 | 7/2017 | Kondo | |
| 2017/0213457 | A1 | 7/2017 | Sato | |
| 2017/0234689 | A1* | 8/2017 | Gibson | B60W 50/14 |
| | | | | 701/25 |
| 2017/0314943 | A1 | 11/2017 | Fujita | |
| 2018/0004211 | A1* | 1/2018 | Grimm | G05D 1/0066 |
| 2018/0050698 | A1* | 2/2018 | Polisson | B60W 30/182 |
| 2018/0105186 | A1* | 4/2018 | Motomura | G06V 10/82 |

FOREIGN PATENT DOCUMENTS

| | | |
|---|---|---|
| WO | 2016/063385 | 4/2016 |
| WO | 2016/170786 A1 | 10/2016 |
| WO | 2016/200762 A1 | 12/2016 |

* cited by examiner

| | SECOND TRAVELING VALUE (AUTOMATIC) | FIRST TRAVELING VALUE (MANUAL) | SCORE | PREVIOUS |
|---|---|---|---|---|
| ACCELERATIONS AND DECELERATIONS | 50 | 40 | 0.25 | 1.2 |
| LANE CHANGE | 3.4 | 3.2 | 0.0625 | 0.7 |
| INTRA-LANE TRAVELING POSITION | -0.78 | -0.84 | 0.0714 | 0.5 |
| TOTAL | | | 0.3839 | 2.4 |

AUTOMATIC DRIVING DIFFICULT LOCATION REPORT

POINT D IN DISTRICT ABC

COMMENT: ALTHOUGH THIS POINT WAS DETERMINED TO BE A DRIVING DIFFICULT LOCATION IN THE PREVIOUS REPORT, THE POINT HAS BEEN IMPROVED IN THIS REPORT.
THIS SCORE IS SAFE.

INFORMATION PROCESSING METHOD FOR DETERMINING DIFFICULT AREA IN WHICH TRAVEL OF VEHICLE BY AUTOMATIC DRIVING IS DIFFICULT, INFORMATION PROCESSING APPARATUS, SYSTEM, AND STORAGE MEDIUM

BACKGROUND

1. Technical Field

The present disclosure relates to an information processing method, an information processing apparatus, a system, and a storage medium.

2. Description of the Related Art

An automatic vehicle is automatically operated and does not need for human driving operation. However, some road situations or peripheral environments may make it difficult for the automatic vehicle to automatically travel.

Japanese Unexamined Patent Application Publication No. 2016-28927, for example, proposes a technology that senses a road shape, a weather condition, an unclear white line, and other specific road environments to decide whether the vehicle can perform automatic driving. If it is decided that automatic driving is not possible, the reason is guided. In this technology, traveling by automatic driving can be avoided in the location in which it is decided that automatic driving is not possible.

SUMMARY

In one general aspect, the techniques disclosed here feature an information processing method that comprises (A) acquiring, from one or more first vehicles, manual driving information that includes a history of manual driving data for each of the first vehicles, (B) acquiring, from one or more second vehicles, automatic driving information that includes a history of automatic driving data for each of the second vehicles, (C) calculating, for each area, a first value of a driving parameter that is correlated with the degree of difficulty in driving according to the manual driving information, (D) calculating, for each area, a second value of the driving parameter according to the automatic driving information, (E) comparing the first value with the second value for each area to determine at least one difficult area in which travel of a vehicle by automatic driving is difficult, and (F) creating difficult area information that indicates the difficult area.

It should be noted that these general or specific aspects may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Underlying Knowledge Forming Basis of the Present Disclosure

An automatic vehicle is automatically operated and does not need for human driving operation. However, some road situations or peripheral environments may make it difficult for the automatic vehicle to automatically travel. In this type of automatic driving difficult location, the automatic vehicle unnecessarily decelerates, stops, or becomes unable to travel. This may lead to an accident.

In an automatic driving difficult location, a human often does not feel difficulty in manual driving, so the human often cannot easily make a decision as to whether the location is an automatic driving difficult location. That is, in some automatic driving difficult locations, even if a manual vehicle can easily travel, if it difficult for an automatic vehicle to travel depending on the road situation or peripheral environment. However, a human cannot easily make a decision as to whether the location is an automatic driving difficult location.

Even if the technology disclosed in Japanese Unexamined Patent Application Publication No. 2016-28927 is used, it is not possible to, for example, infer an automatic driving difficult location because the technology just decides whether automatic driving is possible by sensing a road shape, a weather condition, an unclear white line, and other particular road environments.

In addition, in this disclosed technology, the sensing result is compared with reference data, which is prepared in advance as a reference for a road shape, a weather condition, and a white line, to decide whether automatic driving is possible. However, this disclosed technology is insufficient if map information required for automatic vehicles including other types of automatic vehicles to perform automatic driving is incomplete or the reference data itself is erroneous because, for example, a traffic sign or the like on the road on which the vehicle is traveling has been incorrectly detected.

An information processing method according to an aspect of the present disclosure includes: an acquisition step of acquiring manual driving information that includes a history of driving data for one or more first vehicles that have been manually driven from the one or more first vehicles and also acquiring automatic driving information that includes a history of driving data for one or more second vehicles that have been automatically driven from the one or more second vehicles; a creation step of creating automatic driving difficult location information that indicates an automatic driving difficult location in which travel of an automatically driven vehicle is difficult from the result of a comparison between a first traveling value related to travel of the one or more first vehicles, the first traveling value being calculated from the manual driving information and a second traveling value related to travel of the one or more second vehicles, the second traveling value being calculated from the automatic driving information; and an output step of outputting the created automatic driving difficult location information.

Thus, since an automatic driving difficult location that is difficult for a human to identify can be inferred by collecting both automatic driving information and manual driving information and making a comparison between the first traveling value calculated from the manual driving information and the second traveling value calculated from the automatic driving information, it is possible to output information indicating the inferred automatic driving difficult location.

For example, the first traveling value and second traveling value each include at least one of the number of accelerations and decelerations, the number of lane changes, and a value indicating a traveling position in a lane for one or more first vehicles and one or more second vehicles.

For example, if, in the creation step, the difference between the first traveling value and the second traveling value is equal to or larger than a predetermined value, automatic driving difficult location information may be created.

Thus, since the automatic driving difficult location can be inferred by determining whether the difference between the first traveling value calculated from the collected manual driving information and the second traveling value calculated from the collected automatic driving information is equal to or larger than a threshold, it is possible to output information indicating the inferred automatic driving difficult location.

For example, in the creation step, the automatic driving difficult location information may be created by using a score based on the difference between the first traveling value and the second traveling value.

Thus, since the automatic driving difficult location can be inferred by determining whether the score based on the difference between the first traveling value calculated from the collected manual driving information and the second traveling value calculated from the collected automatic driving information or the sum of scores is equal to or larger than a threshold, it is possible to output information indicating the inferred automatic driving difficult location.

For example, the comparison may be performed for each predetermined region.

Thus, since the automatic driving difficult location can be inferred for each road on which the first vehicle and second vehicle have traveled, for each predetermined distance on the road, or for each predetermined area on the road by comparing the first traveling value with the second traveling value for each road, for each predetermined distance on the road, or for each predetermined area on the road, it is possible to output information indicating the inferred automatic driving difficult location.

For example, the comparison may be made for each predetermined condition that includes at least one of time, a weather condition, and the age of the driver who performs manual driving.

Thus, when the first traveling value is compared with the second traveling value under a condition that is at least one of time, a weather condition, and the age of the driver of a manual vehicle for each road on which the first vehicle and second vehicle have traveled, each predetermined distance on the road, or each predetermined area on the road, it is possible to infer the automatic driving difficult location for each road, each predetermined distance on the road, or each predetermined area on the road.

For example, the automatic driving difficult location information may include, in map information used in automatic driving, information indicating a location that is not indicated in the map information but may become an automatic driving difficult location.

For example, the automatic driving difficult location may include a position on the map used in automatic driving and may also include at least one of the position of a traffic sign that has been incorrectly detected on the road on which the automatic vehicle traveled, the position of an obstacle on the road, and the position of a lane on the road.

An information processing apparatus according to an aspect of the present disclosure includes: an acquirer that acquires manual driving information that includes a history of driving data for one or more first vehicles that have been manually driven from the one or more first vehicles and also acquires automatic driving information that includes a history of driving data for one or more second vehicles that have been automatically driven from the one or more second vehicles; a creator that creates automatic driving difficult location information that indicates an automatic driving difficult location inferred based on the result of a comparison between a first traveling value related to travel of the one or more first vehicles, the first traveling value being calculated from the manual driving information and a second traveling value related to travel of the one or more second vehicles, the second traveling value being calculated from the automatic driving information; and an outputer that outputs the created automatic driving difficult location information.

An information processing method according to an aspect of the present disclosure includes: an acquisition step of acquiring manual driving information that includes a history of driving data for one or more first vehicles that have been manually driven and also acquiring automatic driving information that includes a history of driving data for one or more second vehicles that have been automatically driven; a creation step of creating automatic driving difficult location information that indicates a location in which travel of an automatically driven vehicle is difficult, the location being inferred from the result of a comparison between the manual driving information and the automatic driving information; and an output step of outputting the created automatic driving difficult location information.

An information processing method according to an aspect of the present disclosure is an information processing method executed by a computer, the method comprising (A) acquiring, from one or more first vehicles, manual driving information that includes a history of manual driving data for each of the one or more first vehicles, (B) acquiring, from one or more second vehicles, automatic driving information that includes a history of automatic driving data for each of the one or more second vehicles, (C) calculating, for each area, a first value of a driving parameter that is correlated with the degree of difficulty in driving according to the manual driving information, (D) calculating, for each area, a second value of the driving parameter according to the automatic driving information, (E) comparing the first value with the second value for each area to determine at least one difficult area in which travel of a vehicle by automatic driving is difficult, and (F) creating difficult area information that indicates the at least one difficult area.

For example, for each area in which the one or more first vehicles have traveled, the manual driving information may include at least one of the number of accelerations and decelerations performed by each of the one or more first vehicles, the number of lane changes made by each of the one or more first vehicles, and the position, relative to the lane, of each of the one or more first vehicles during driving.

For example, for each area in which the one or more second vehicles have traveled, the automatic driving information may include at least one of the number of accelerations and decelerations performed by each of the one or more second vehicles, the number of lane changes made by each of the one or more second vehicles, and the position, relative to the lane, of each of the one or more second vehicles during driving.

For example, the driving parameter may be the number of accelerations and decelerations performed by each vehicle, the number of lane changes made by each vehicle, the position, relative to the lane, of each vehicle during driving, or any combination of these values.

In (E) above in the information processing method, the difference between the first value and the second value may be calculated for each area, and an area for which the difference is equal to or larger than a predetermined value may be determined to be the at least one difficult area.

The information processing method according to the above aspect may further comprise (C') calculating, for each area, a third value of another driving parameter that is correlated with the degree of difficulty in driving according to the manual driving information, (D') calculating, for each area, a fourth value of the other driving parameter according to the automatic driving information. In (E) above, for each area, (E1) a first difference between the first value and the second value may be calculated, (E2) a first score may be determined according to the first difference, (E3) a second difference between the third value and the fourth value may be calculated, (E4) a second score may be determined according to the second difference, (E5) a total score may be determined from a plurality of scores including the first score and the second score, and (E6) an area for which the total score is equal to or larger than a predetermined value may be determined to be the at least one difficult area.

For example, each area may be a road or one of a plurality of areas into which the road is divided at intervals of a predetermined length of the road, a predetermined area of the road, or longitudinal and latitudinal intervals.

The information processing method according to the above aspect may further include (G) acquiring condition information that indicates at least one of conditions that indicate a time zone in which the one or more first vehicles have traveled in an area, a weather condition, and the driver. In (E) above, the first value and second value acquired in the same condition or similar conditions may be compared with each other.

In (F) above in the information processing method according to the above aspect, (F1) situation information that indicates a road situation in the at least one difficult area may be acquired from the one or more first vehicles, the one or more second vehicles, or a monitoring system installed on the road, (F2) a comparison may be made between the situation information and map information that indicates an area corresponding to the difficult area, the map information being part of map data referenced when the one or more second vehicles travel by auto driving, and (F3) update information used to update the map information in the map data may be created according to the result of the comparison. The difficult area information that indicates the at least one difficult area may include the update information.

For example, the situation information may include a traffic sign, an obstacle, and/or information indicating the position of the lane in the at least one difficult area.

The present disclosure can be implemented not only as an apparatus but also as an integrated circuit having processing functions provided by this type of apparatus, as a method by which the processing functions in the apparatus are executed as steps, as a program that causes a computer to execute these steps, or as information, data, or signals that indicate the program. The program, information, data, and signals may be distributed in the form of a storage medium such as a compact disc-read-only memory (CD-ROM) or through a communication medium such as the Internet.

Embodiments in the present disclosure will be described below with reference to the drawings. Embodiments described below are just specific examples of the present disclosure. Numerals, shapes, materials, constituent elements, the placement positions and connection forms of these constituent elements, steps, the sequence of these steps, and the like indicated in the embodiments below are just examples, and are not intended to restrict the present disclosure. Of the constituent elements in the embodiments below, constituent elements not described in independent claims, each of which indicates the topmost concept of the present disclosure, will be described as arbitrary constituent elements.

Embodiments

Structure of an Information Processing System 1

Figure 1:
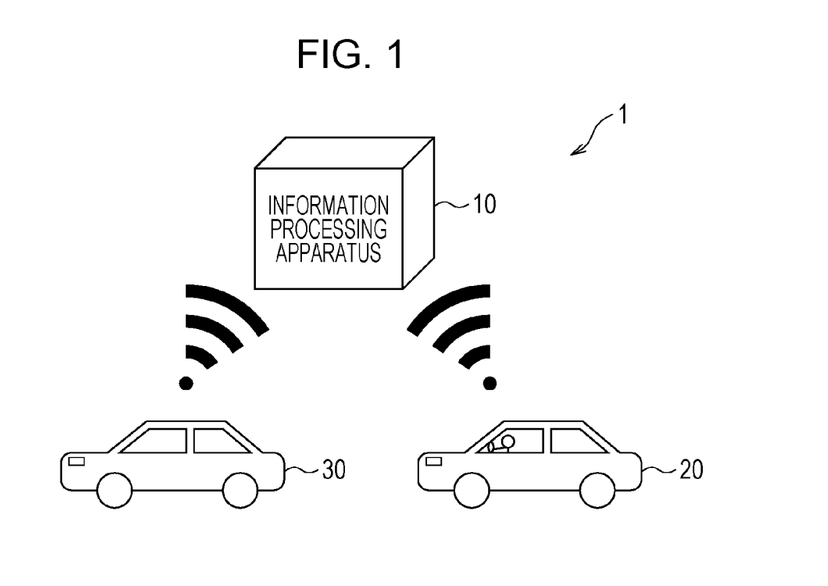
FIG. 1 illustrates an example of the structure of an information processing system according to an embodiment.

FIG. 1 illustrates an example of the structure of an information processing system 1 according to an embodiment.

The information processing system 1 in FIG. 1 includes an information processing apparatus 10, one or more first vehicles 20, and one or more second vehicles 30. The information processing apparatus 10 and the one or more first vehicles 20 may mutually communicate directly through a wireless local area network (LAN) or another type of network or with a server (not illustrated) intervening therebetween. Similarly, the information processing apparatus 10 and the one or more second vehicles 30 may mutually communicate directly through a network or with a server (not illustrated) intervening therebetween.

The structures of the first vehicle 20, second vehicle 30, and information processing apparatus 10 will be described below.

First Vehicle 20

Each of the one or more first vehicles 20 is manually operated. It transmits driving data. The first vehicle 20 is, for example, a manual vehicle the operation of which is performed by a driver.

Figure 2:
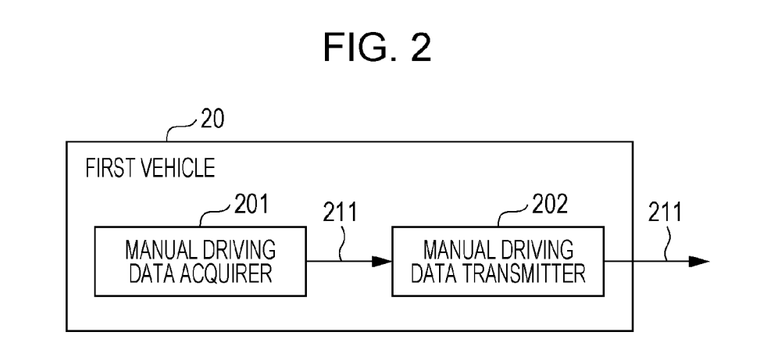
FIG. 2 is a block diagram illustrating an example of part of the structure of a first vehicle according to an embodiment.

FIG. 2 is a block diagram illustrating an example of part of the structure of the first vehicle 20 according to an embodiment.

The first vehicle 20 illustrated in FIG. 2 includes a manual driving data acquirer 201 and a manual driving data transmitter 202.

Manual Driving Data Acquirer 201

The manual driving data acquirer 201 acquires driving data 211 from the first vehicle 20. The driving data 211 includes information about the operation of the first vehicle 20 by the driver and information about the traveling of the first vehicle 20. The operation information may include, for example, steering of the steering wheel, operation of the accelerator pedal, operation of the brake pedal, and operation of blinkers. Alternatively, the operation information may include the steering angle of tires, the opening of the accelerator, a brake pressure, and other information indicating vehicle actuator's control based on these operations. The traveling information may include any combination of a traveling speed obtained by a sensor, a traveling lane, a traveling position in the traveling lane, a weather condition, time, and positional information obtained by Global Navigation Satellite System (GNSS) such as Global Positioning System (GPS). The sensor only needs to appropriately have a camera that captures a two-dimensional (2D) image, a stereo camera, a time-of-flight (TOF) camera, a laser imaging detection and ranging (LIDAR) system that acquires three-dimensional (3D) point group information, and an accelerator sensor.

The driving data 211 may further include the age of the driver and information indicating that, for example, the first vehicle 20 is a manual vehicle.

Manual Driving Data Transmitter 202

The manual driving data transmitter 202 transmits the driving data 211 acquired by the manual driving data acquirer 201 to the information processing apparatus 10.

The manual driving data transmitter 202 may successively transmit the driving data 211 acquired by the manual driving data acquirer 201 to the information processing apparatus 10. Alternatively, the manual driving data transmitter 202 may transmit the driving data 211 acquired by the manual driving data acquirer 201 at intervals of a certain length of time as a history of the driving data 211.

Second Vehicle 30

Each of the one or more second vehicles 30 is automatically driven. It transmits driving data. The second vehicle 30 is, for example, an automatic vehicle the operation of which is automatically performed by a driver without needing human driving operation.

Figure 3:
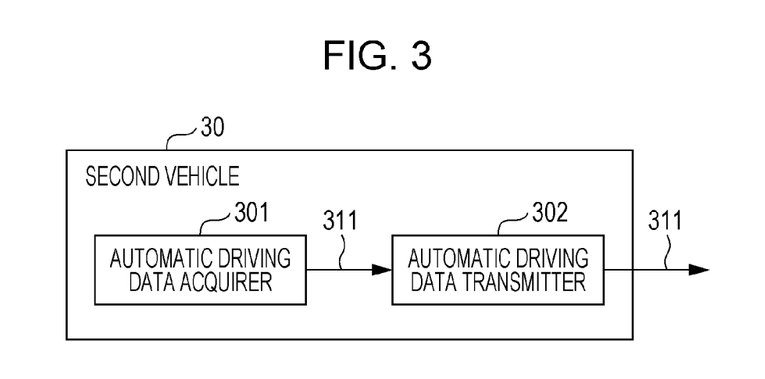
FIG. 3 is a block diagram illustrating an example of part of the structure of a second vehicle according to an embodiment.

FIG. 3 is a block diagram illustrating an example of part of the structure of the second vehicle 30 according to an embodiment.

The second vehicle 30 illustrated in FIG. 3 includes an automatic driving data acquirer 301 and an automatic driving data transmitter 302.

Automatic Driving Data Acquirer 301

The automatic driving data acquirer 301 acquires driving data 311 from the second vehicle 30. The driving data 311 includes information about the operation of the second vehicle 30 by automatic driving, information about the traveling of the second vehicle 30, and the like. The operation information and traveling information are as described above, so their descriptions will be omitted.

The driving data 311 may further include information indicating that, for example, the second vehicle 30 is an automatic vehicle.

Automatic Driving Data Transmitter 302

The automatic driving data transmitter 302 transmits, to the information processing apparatus 10, a history of the driving data 311 acquired by the automatic driving data acquirer 301.

The automatic driving data transmitter 302 may successively transmit the driving data 311 acquired by the automatic driving data acquirer 301 to the information processing apparatus 10. Alternatively, the automatic driving data transmitter 302 may transmit the driving data 311 acquired by the automatic driving data acquirer 301 at intervals of a predetermined length of time as a history of the driving data 311.

Information Processing Apparatus 10

Figure 4:
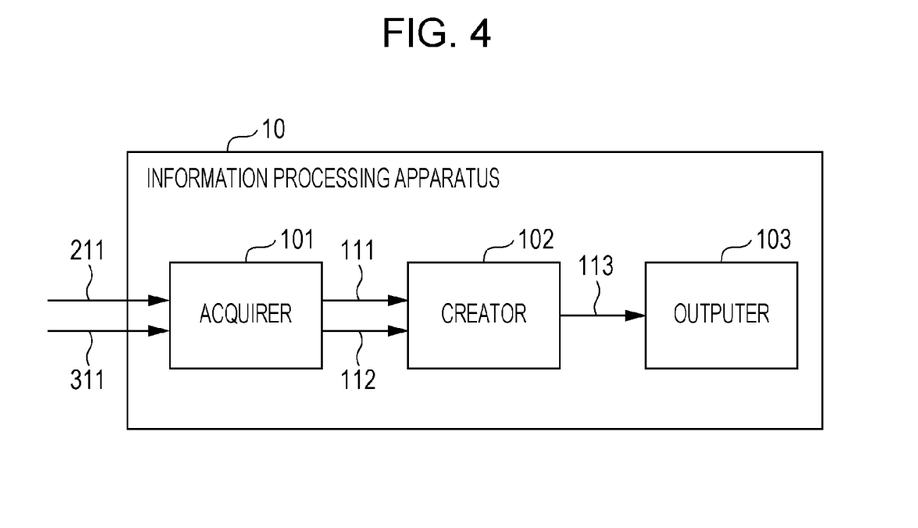
FIG. 4 is a block diagram illustrating an example of the structure of an information processing apparatus according to an embodiment.
Figure 5:
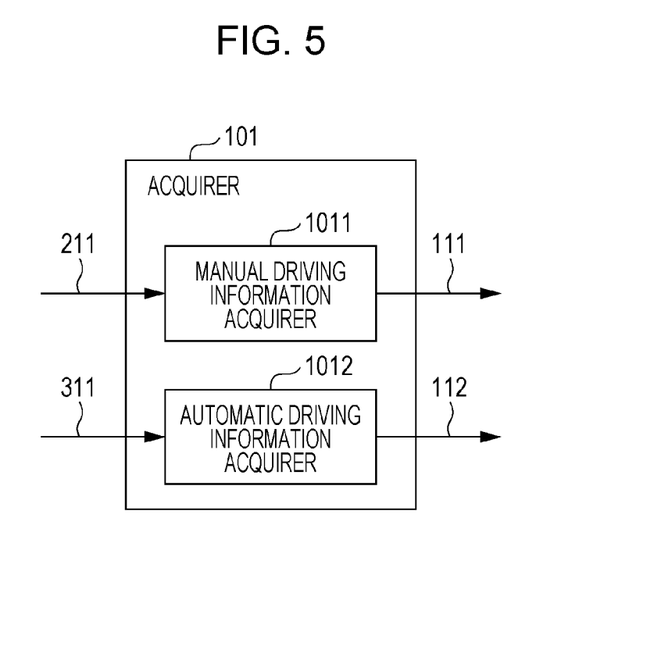
FIG. 5 is a block diagram illustrating, in detail, an example of the structure of the acquirer illustrated in FIG. 4.
Figure 6:
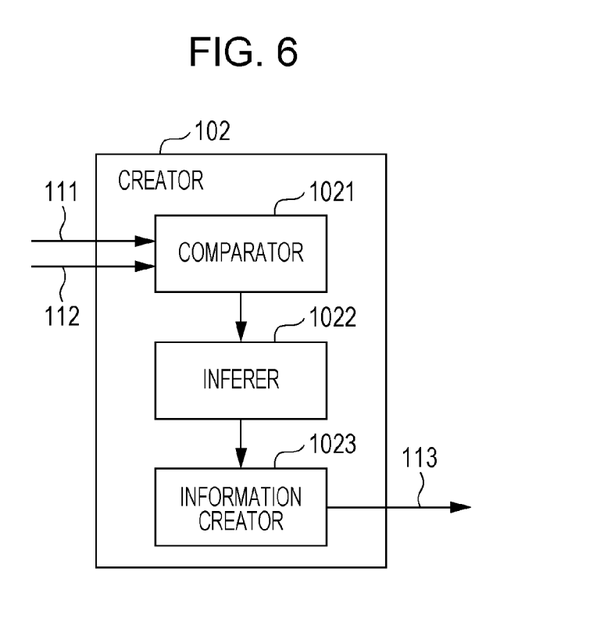
FIG. 6 is a block diagram illustrating, in detail, an example of the structure of the creator illustrated in FIG. 4.

FIG. 4 is a block diagram illustrating an example of the structure of an information processing apparatus 10 according to an embodiment. FIG. 5 is a block diagram illustrating, in detail, an example of the structure of the acquirer 101 illustrated in FIG. 4. FIG. 6 is a block diagram illustrating, in detail, an example of the structure of the creator 102 illustrated in FIG. 4.

In addition to the acquirer 101 and creator 102, the information processing apparatus 10 illustrated in FIG. 4 includes an outputer 103. However, the outputer 103 is not essential to the information processing apparatus 10.

Acquirer 101

The acquirer 101 acquires manual driving information including a history of the driving data 211 for one or more first vehicles 20 that have been manually operated and automatic driving information including a history of the driving data 311 for one or more second vehicles 30 that have been an automatically driven. The acquirer 101 acquires the manual driving information from one or more first vehicles 20 and also acquires the automatic driving information from one or more second vehicles 30.

In this embodiment, the acquirer 101 has a manual driving information acquirer 1011 and an automatic driving information acquirer 1012 as illustrated in FIG. 5. The manual driving information acquirer 1011 has a recording apparatus (not illustrated) such as a hard disk drive (HDD). The manual driving information acquirer 1011 successively acquires the driving data 211 about one or more first vehicles 20 and accumulates a history of the driving data 211 as manual driving information 111. The manual driving information acquirer 1011 may acquire a history of the driving data 211 about one or more first vehicles 20 and may accumulate the history in the storage medium as the manual driving information 111. The automatic driving information acquirer 1012 also has a recording apparatus (not illustrated) such as an HDD. The automatic driving information acquirer 1012 successively acquires the driving data 311 about one or more second vehicles 30 and accumulates a history of the driving data 311 as automatic driving information 112. The automatic driving information acquirer 1012 may similarly acquire a history of the driving data 311 about one or more second vehicles 30 and may accumulate the history in the storage medium as the automatic driving information 112.

Creator 102

The creator 102 creates automatic driving difficult location information that indicates an automatic driving difficult location in which travel of an automatically driven vehicle is difficult, the location being inferred from the result of a comparison between manual driving information and automatic driving information. Specifically, the creator 102 makes a comparison between a first traveling value, calculated from the automatic driving information 112, which is a value related to the traveling of one or more first vehicles 20, and a second traveling value, calculated from automatic driving information 113, which is a value related to the traveling of one or more second vehicles 30, and creates automatic driving difficult location information that indicates an automatic driving difficult location in which travel of an automatically driven vehicle is difficult. If the difference between the first traveling value and the second traveling value is equal to or larger than a predetermined value, the creator 102 creates automatic driving difficult location information. This comparison is made for each predetermined region resulting from dividing a road by a grid, line segment, or the like. Furthermore, the comparison may be made for each predetermined condition that includes at least one of time, a weather condition, and the age of the driver who performs manual driving.

In this embodiment, the creator 102 has a comparator 1021, an inferer 1022, and an information creator 1023, as illustrated in FIG. 6.

Comparator 1021

The comparator 1021 calculates the first traveling value, which is a value related to the traveling of one or more first vehicles 20, from the manual driving information 111 accumulated by the manual driving information acquirer 1011. The comparator 1021 also calculates the second traveling value, which is a value related to the traveling of one or more second vehicles 30, from the automatic driving information 112 accumulated by the automatic driving information acquirer 1012.

The first traveling value and second traveling value each include, for example, at least one of the number of accelerations and decelerations, the number of lane changes, and a value indicating a traveling position in a lane for one or more first vehicles 20 and one or more second vehicles 30. The first traveling value and second traveling value may include other values.

If, for example, the first traveling value and second traveling value are each the number of accelerations and decelerations, the comparator 1021 calculates, as the first traveling value, the number of accelerations and decelerations indicated by the number of times the accelerator pedal and brake pedal have been depressed in the first vehicle 20 per unit distance (the number of times/meter) from the manual driving information 111. Similarly, the comparator 1021 calculates, as the second traveling value, the number of accelerations and decelerations indicated by the number of times the accelerator pedal and brake pedal have been depressed in the second vehicle 30 per unit distance (the number of times/meter) from the automatic driving information 112. The number of accelerations and decelerations is incremented by one each time the accelerator pedal or decelerator pedal is depressed in the first vehicle 20 or second vehicle 30 in a state in which accelerator pedal or decelerator pedal is not depressed. The first traveling value includes the number of accelerations and decelerations in one or more first vehicles 20, and the second traveling value includes the number of accelerations and decelerations in one or more second vehicles 30.

If a plurality of first vehicles 20 are present, the first traveling value only needs to be an average obtained by dividing the numbers of accelerations and decelerations per unit distance for all first vehicles 20, which are measurements for all the first vehicles 20, by the number of first vehicles 20. This is also true for a case in which a plurality of second vehicles 30 are present; the second traveling value can be similarly obtained. Specifically, the number of accelerations and decelerations in N vehicles can be calculated from equation (1) below.

$$\frac{\sum_{k=1}^{n} \text{number of accelerations and decelerations per unit distance in vehicle } (k)}{n} \quad (1)$$

It will be assumed that, for example, four manual vehicles, that is, four first vehicles 20 are present and the numbers of accelerations and decelerations per unit distance are [1, 3, 2, 1] in these first vehicles 20. Then, according to equation (1), the first traveling value is obtained by dividing a value of 7, which is the sum for the four first vehicles 20, by four, which is the number of first vehicles 20, resulting in 1.75.

Similarly, it will be assumed that, for example, six automatic vehicles, that is, six second vehicles 30 are present and the numbers of accelerations and decelerations per unit distance per unit distance are [1, 2, 5, 3, 3, 4] in these second vehicles 30. Then, according to equation (1), the second traveling value is obtained by dividing a value of 18, which is the sum for the six second vehicles 30, by six, which is the number of second vehicles 30, resulting in 3.0.

As described above, even if there is a mismatch in the number of samples such as the number of vehicles between the manual driving information 111 and the automatic driving information 112, different numbers of samples can be similarly handled by performing statistical processing.

If, for example, the first traveling value and second traveling value each indicate the number of lane changes, the comparator 1021 calculates, as the first traveling value, the number of lane changes indicated by the number of times the first vehicle 20 has changed a lane per unit distance (the number of times/meter) from the manual driving information 111. Similarly, the comparator 1021 calculates, as the second traveling value, the number of lane changes indicated by the number of times the second vehicle 30 has changed a lane per unit distance (the number of times/meter) from the automatic driving information 112. The number of lane changes is incremented by one each time the first vehicle 20 or second vehicle 30 changes a lane to the right or left lane. The first traveling value includes the number of lane changes by one or more first vehicles 20, and the second traveling value includes the number of lane changes by one or more second vehicles 30.

If a plurality of first vehicles 20 are present, the first traveling value only needs to be an average obtained by dividing the numbers of lane changes per unit distance for all first vehicles 20, which are measurements for all the first vehicles 20, by the number of first vehicles 20. This is also true for a case in which a plurality of second vehicles 30 are present; the second traveling value can be similarly obtained.

If, for example, the first traveling value indicates a traveling position in a lane, the comparator 1021 calculates, as the first traveling value, an intra-lane traveling position that is indicated by the average of the degrees of deviation in distance between the center of the lane and the center of the first vehicle 20, from the manual driving information 111. Similarly, if the second traveling value indicates a traveling position in a lane, the comparator 1021 calculates, as the second traveling value, an intra-lane traveling position that is indicated by the average of the degrees of deviation in distance between the center of the lane and the center of the second vehicle 30, from the automatic driving information 112. As described above, the intra-lane traveling position is the average of the degrees of deviation in distance between the center of the lane and the center of the first vehicle 20 or second vehicle 30. When the center of the vehicle deviates from the center of the lane toward the right lane, the degree of deviation in distance between the center of the lane and the center of the vehicle is calculated as positive. When the center of the vehicle deviates from the center of the lane toward the left lane, the degree of deviation in distance between the center of the lane and the center of the vehicle is calculated as negative. The first traveling value includes the intra-lane traveling positions of one or more first vehicles 20. The second traveling value includes the intra-lane traveling positions of one or more second vehicles 30.

If a plurality of first vehicles 20 are present, the first traveling value only needs to be an average obtained by dividing intra-lane traveling positions of all first vehicles 20, which are measurements for all the first vehicles 20, by the number of first vehicles 20. This is also true for a case in which a plurality of second vehicles 30 are present; the second traveling value can be similarly obtained.

The comparator 1021 compares the calculated first traveling value with the second traveling value.

In this embodiment, the comparator 1021 compares the calculated first traveling value with the second traveling value for, for example, a road on which the first vehicle 20 and second vehicle 30 have traveled or for each predetermined region, on the road, resulting from dividing the road by a grid, line segment, or the like, the predetermined region being represented by a predetermined distance on the road, a predetermined area on the road, or the like. Alternatively, the comparison may be made for each predetermined condition. The predetermined condition may be time, a weather condition, or the age of the driver who performs manual driving. Time may include, for example, a specific time or a specific time zone such as an evening, daytime, or nighttime.

The comparator 1021 may calculate a score based on the difference between the first traveling value and the second traveling value.

If, for example, the comparator 1021 calculates the number of accelerations and decelerations as the first traveling value and second traveling value, the comparator 1021 may further calculate the difference between the first traveling value and the second traveling value per unit distance and may divide the difference by the first traveling value, which is information related to manual driving, to calculate a normalized acceleration and deceleration score. That is, the comparator 1021 may calculate ((number of accelerations and decelerations in automatic driving)−(number of accelerations and decelerations in manual driving))/(number of accelerations and decelerations in manual driving) for each predetermined region as the acceleration and deceleration score based on the difference between the first traveling value and the second traveling value.

It will be assumed that four first vehicles 20 are present and the numbers of acceleration and deceleration times per unit distance are [1, 3, 2, 1] in these first vehicles 20 and that six second vehicles 30 are present and the numbers of acceleration and deceleration times per unit distance are [1, 2, 5, 3, 3, 4] in these second vehicles 30. In this case, the acceleration and deceleration score can be calculated by dividing (3.0-1.75) by 1.75, resulting in 0.71.

If, for example, the comparator 1021 calculates the number of lane changes as the first traveling value and second traveling value, the comparator 1021 may further calculate the difference between the first traveling value and the second traveling value per unit distance and may divide the difference by the first traveling value, which is information related to manual driving, to calculate a normalized lane change score. That is, the comparator 1021 may calculate ((number of lane changes in automatic driving)−(number of lane changes in manual driving))/(number of lane changes in manual driving) for each predetermined region as the lane change score based on the difference between the first traveling value and the second traveling value.

If, for example, the comparator 1021 calculates a traveling position in a lane as the first traveling value and second traveling value, the comparator 1021 may further calculate the difference between the first traveling value and the second traveling value and may divide the difference by the first traveling value, which is information related to manual driving, to calculate a normalized intra-lane traveling position score. That is, the comparator 1021 may calculate ((average of degrees of deviation in distance between center of lane and center of vehicle in automatic driving)−(average of degrees of deviation in distance between center of lane and center of vehicle in manual driving))/(average of degrees of deviation in distance between center of lane and center of vehicle in manual driving) for each predetermined region as the intra-lane traveling position score based on the difference between the first traveling value and the second traveling value.

If, for example, the comparator 1021 calculates the first traveling value and second traveling value that includes the number of accelerations and decelerations, the number of lane changes, and an intra-lane traveling position, the comparator 1021 may calculate a total score obtained by totalizing the acceleration and deceleration score, lane change score, and intra-lane traveling position score described above. That is, as the total score based on the difference between the first traveling value and second traveling value, the comparator 1021 may calculate the sum of the acceleration and deceleration score, lane change score, and intra-lane traveling position score for each predetermined region.

As described above, when a score based on a comparison between the first traveling value and the second traveling value or the sum of scores of this type is used, a difference obtained by comparing at least one of the first traveling value and second traveling value, for example, can be quantified, that is, can be represented as a numeral.

Inferer 1022

The inferer 1022 infers an automatic driving difficult location from a comparison result obtained from the comparator 1021. Alternatively, the inferer 1022 may use a score based on the difference calculated by the comparator 1021 between the first traveling value and the second traveling value to infer an automatic driving difficult location.

The automatic driving difficult location includes a position on a map used in automatic driving and also includes at least one of the position of a traffic sign that has been incorrectly detected on a road on which an automatic vehicle traveled, the position of an obstacle on the road, and the position of a lane on the road. The position of this type of traffic sign, the position of an obstacle, and the position of a lane are examples that are not recognized as difficult in manual driving performed by a human but make it difficult for an automatic vehicle to travel.

This automatic driving difficult location is, for example, a location in which a tree exuberant in green in the vicinity of a road extends to the road or a newly erected signboard extends to the road. A possible automatic driving difficult location is an incomplete location on the current map that is used in automatic driving and in which information about the above location is not reflected. In this case, a manual vehicle can adapt to the automatic driving difficult location when the driver just makes a decision and performs a driving operation to avoid the location. However, an automatic vehicle may not be able to identify the thing in the location; the automatic vehicle may not be able to determine, for example, whether the thing in the location is a living thing or the like. Therefore, the automatic vehicle may unnecessarily decelerate or stop, preventing it from smoothly adapt to the automatic driving difficult location.

The automatic driving difficult location is not limited to an environmental change on a road. A change in the presence or absence of leaves of a tree in the vicinity of the road, a change in the addition or deletion of a sign beside the road, and an environmental change around the road such as building construction, for example, may cause an automatic driving difficult location. This is because when the automatic vehicle obtains its position by comparing the peripheral environment with the map, a change in the peripheral environment as described above increases error in the position of the automatic vehicle. In an automatic driving difficult location, error in the position of the automatic vehicle may lead to, for example, an incorrect traveling position or route, in which case the automatic vehicle may adapt to the automatic driving difficult location.

Another possible automatic driving difficult location is the position of a lane that a human can identify but is difficult for the sensing device mounted on the automatic vehicle to identify. Similarly, a traffic sign, obstacle, and lane that a human can identify but the sensing device mounted on the automatic vehicle incorrectly detects may also be automatic driving difficult locations. The manual vehicle can adapt to these automatic driving difficult locations when the driver just makes a decision and performs normal driving operation. However, the automatic vehicle may unnecessarily decelerate and travel at slow speed or stop because the position of the lane is unclear or the obstacle has been incorrectly detected. This may prevent the automatic vehicle from smoothly adapting to these automatic driving difficult locations.

The map described above that is used in automatic driving may be, for example, a dynamic map. However, the map only needs to be map information that includes an environmental map that includes information required when the automatic vehicle performs automatic driving.

Figure 7:
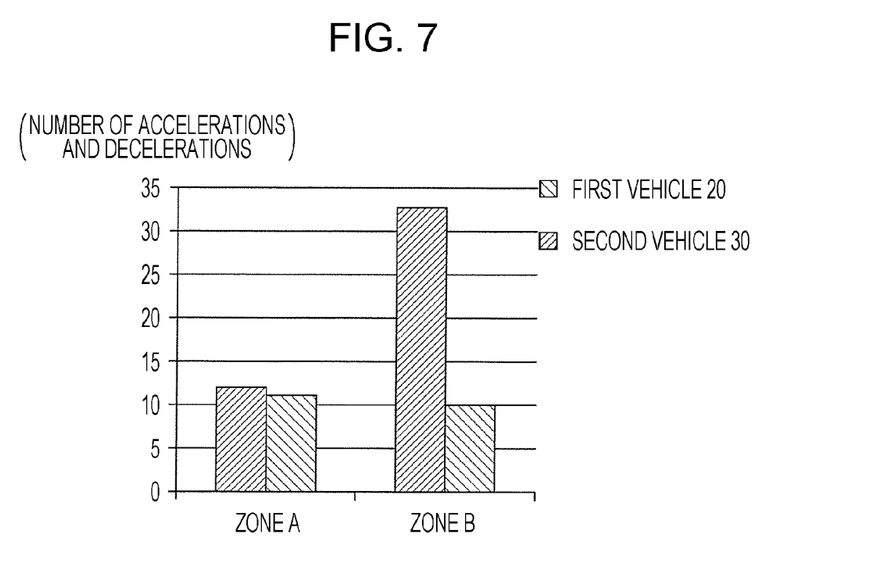
FIG. 7 illustrates an example of an automatic driving difficult location inferred by an inferer according to an embodiment.

FIG. 7 illustrates an example of an automatic driving difficult location inferred by the inferer 1022 according to an embodiment. In FIG. 7, the difference between the first traveling value and second traveling value, each of which indicates the number of accelerations and decelerations, is illustrated in a zone A and a zone B. Specifically, in FIG. 7, the comparator 1021 calculates the number of accelerations and decelerations as the first traveling value and second traveling value and compares the first traveling value with the second traveling value in the zone A and zone B. The zone A and zone B are particular two regions each of which is, for example, the predetermined region described above.

The inferer 1022 decides whether the difference between the first traveling value and the second traveling value, illustrated in FIG. 7, in the zone A and zone B is equal to or larger than a threshold and infers that the zone A is not an automatic driving difficult location and the zone B is an automatic driving difficult location. That is, the inferer 1022 compares the first traveling value with the second traveling value and infers whether the zone is an automatic driving difficult location depending on whether the difference between them, which is the comparison result, is equal to or larger than the threshold. This is also true for a case in which the first traveling value and second traveling value represent the number of lane changes or an intra-lane traveling position, so descriptions for the case will be omitted.

When the comparator 1021 calculates a score based on a comparison between the first traveling value and the second traveling value, the inferer 1022 may infer whether the zone is an automatic driving difficult location depending on whether the score calculated by the comparator 1021 or the sum of scores is equal to or larger than a threshold. Alternatively, the inferer 1022 may infer whether the zone is an automatic driving difficult location depending on whether the difference between a score calculated by the comparator 1021 this time and the previous score calculated by the comparator 1021 is equal to or larger than a threshold.

Information Creator 1023

The information creator 1023 creates automatic driving difficult location information that indicates an automatic driving difficult location inferred by the inferer 1022. When the comparator 1021 calculates a score based on a comparison between the first traveling value and the second traveling value, the information creator 1023 may use the score to create an automatic driving difficult location report that indicates an automatic driving difficult location inferred by the inferer 1022 as the automatic driving difficult location information.

Figure 8:
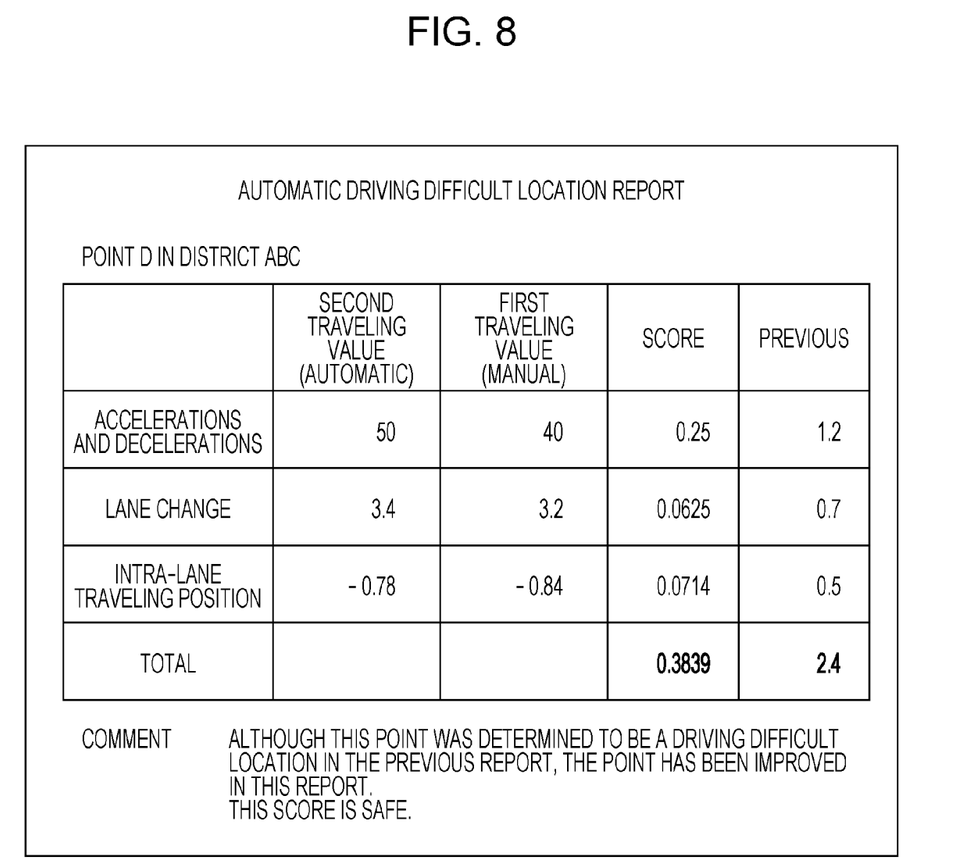
FIG. 8 illustrates an example of an automatic driving difficult location report created by an information creator according to an embodiment.

FIG. 8 illustrates an example of an automatic driving difficult location report created by the information creator 1023 according to an embodiment. The automatic driving difficult location report in FIG. 8 indicates the first traveling value and second traveling value that indicate the number of accelerations and decelerations, the number of lane changes, and an intra-lane traveling position in a point D in a district ABC, which is a predetermined zone. The automatic driving difficult location report in FIG. 8 also indicates an acceleration and deceleration score, a lane change score, an intra-lane traveling position score, and a total score together with their previous values. A comment for these scores is also provided, indicating that this zone is safe, that is, although the zone was determined to be an automatic driving difficult location in the previous report, countermeasures were taken and the zone is now not an automatic driving difficult location.

The information creator 1023 creates automatic driving difficult location information that indicates an automatic driving difficult location inferred by the inferer 1022 as described above. In addition to the new automatic driving difficult location inferred this time, the information creator 1023 may create the result of a comparison with the previously inferred automatic driving difficult location as the automatic driving difficult location information. That is, as the comparison result, the information creator 1023 may create automatic driving difficult location information that includes values measured in automatic driving, values measured in manual driving, scores obtained this time, previous scores, and a comment indicating whether the scores are in a safety range. Thus, it is possible to quantify an automatic driving difficult location that is difficult for a human to identify, that is, to represent such a location as a numeral. Furthermore, this automatic driving difficult location information may be utilized to determine a timing at which to update map information used in automatic driving.

In addition to the automatic driving difficult location inferred by the inferer 1022, the information creator 1023 may output, to map information used in automatic driving, automatic driving difficult location information that includes information indicating a location that is not indicated in the map information but may become an automatic driving difficult location.

Figure 9:
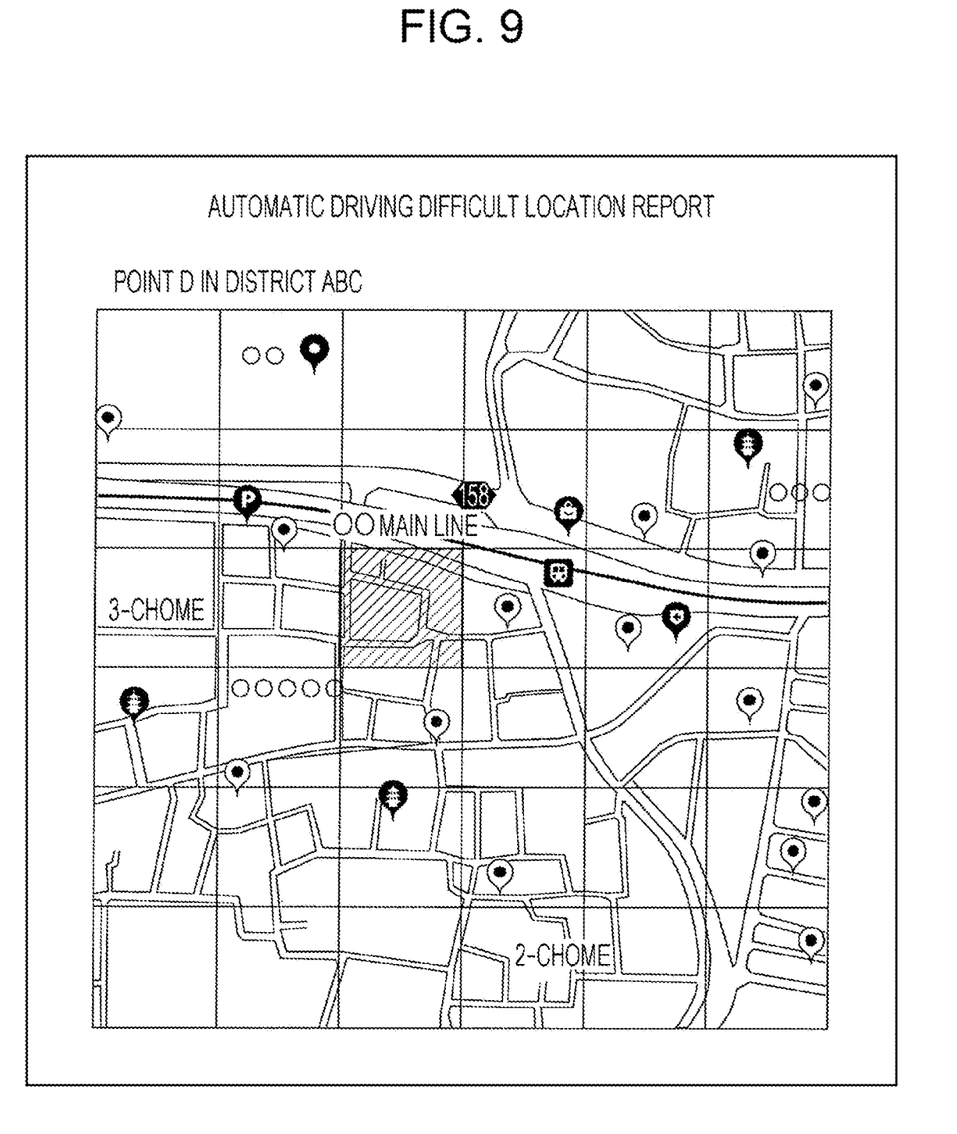
FIG. 9 illustrates an example of information included in the automatic driving difficult location report created by the information creator according to an embodiment.

FIG. 9 illustrates an example of information included in the automatic driving difficult location report created by the information creator 1023 according to an embodiment.

As illustrated in FIG. 9, the automatic driving difficult location report may include information that identifies a specific area that includes an automatic driving difficult location. Information indicated in FIG. 9 is an example of information included in an automatic driving difficult location report. In the map information that indicates the point D in the district ABC, the information identifies a specific area including a single crosshatched area relating to an automatic driving difficult location. The information indicated in FIG. 9 may be information that represents a screen to be submitted to the road management company.

As described above, the information creator 1023 may create automatic driving difficult location information that includes a specific area that includes an automatic driving difficult location, as automatic driving difficult location information. Specifically, the information creator 1023 may further create, in map information used in automatic driving, automatic driving difficult location information that includes information indicating a location that is not indicated in the map information but may become an automatic driving difficult location. Thus, it is possible to update map information corresponding to a specific area including an automatic driving difficult location that is difficult for a human to identify or to efficiently update map information by, for example, promoting the map maker to update the map information. As a result, it is possible to update the map information so as to eliminate the location, on the map, that has not been updated.

Outputer 103

The outputer 103 outputs automatic driving difficult location information created by the creator 102. Although the outputer 103 may output, for example, the automatic driving difficult location report illustrated in FIG. 8 or an automatic driving difficult location report in which information in FIG. 9 is added to the report in FIG. 8 as automatic driving difficult location information, there is no limitation on the form of automatic driving difficult location information if it indicates an automatic driving difficult location.

Operation of the Information Processing Apparatus 10

Next, the operation of the information processing apparatus 10 structured as described above will be described with reference to drawings.

Figure 10:
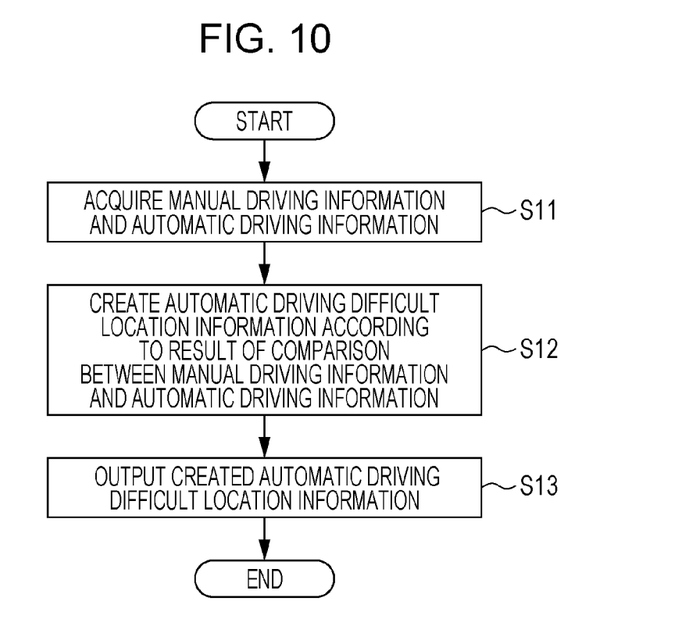
FIG. 10 is a flowchart illustrating the operation of the information processing apparatus according to an embodiment.

FIG. 10 is a flowchart illustrating the operation of the information processing apparatus 10 according to an embodiment.

First, the information processing apparatus 10 acquires the manual driving information 111 and automatic driving information 112 (S11). Specifically, the information processing apparatus 10 acquires driving data 211 for one or more first vehicles 20 and accumulates a history of the driving data 211 as the manual driving information 111. The information processing apparatus 10 also acquires the driving data 311 for one or more second vehicles 30 accumulates a history of the driving data 311 as the automatic driving information 112.

Next, the information processing apparatus 10 creates automatic driving difficult location information according to the result of a comparison between the manual driving information 111 and automatic driving information 112 acquired in S11 (S12).

Next, the information processing apparatus 10 outputs the automatic driving difficult location information created in S12 (S13).

Figure 11:
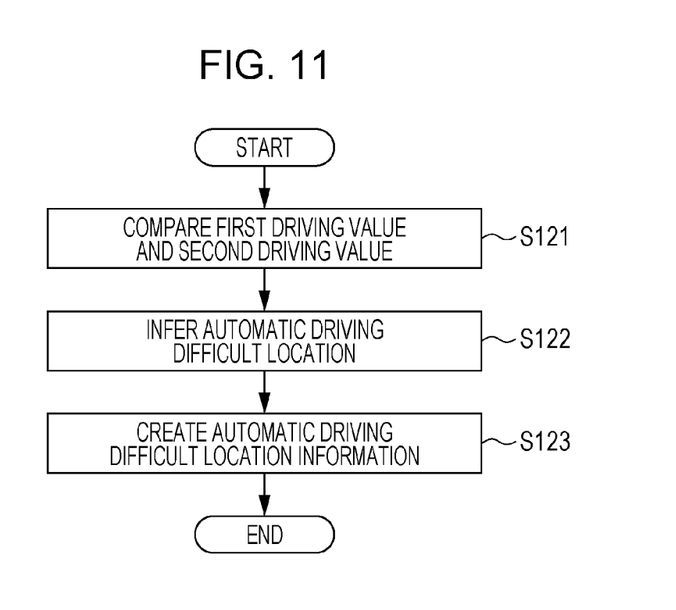
FIG. 11 is a flowchart illustrating operation in S12 in FIG. 10 in detail.

FIG. 11 is a flowchart illustrating operation in S12 in FIG. 10 in detail.

In S12, the information processing apparatus 10 first makes a comparison between the first traveling value calculated from the manual driving information 111 and the second traveling value calculated from the automatic driving information 112 (S121). As described above, the first traveling value and second traveling value may be, for example, a value that indicates the number of accelerations and decelerations, the number of lane changes, an intra-lane traveling position, or any combination of these values. This comparison may be made for each predetermined area as described above, may be made according to a difference calculated for each predetermined condition, or may be made by using a score based on the difference between the first traveling value and the second traveling value.

Next, the information processing apparatus 10 infers an automatic driving difficult location, which indicates a driving difficult location in which travel of an automatic vehicle such as the second vehicle 30 is difficult, from the comparison result obtained in S121 (S122). Specifically, the information processing apparatus 10 infers a region in which the difference between the first traveling value and the second traveling value, which is obtained by comparing them for each predetermined region, is equal to or larger than a threshold, as the automatic driving difficult location. The information processing apparatus 10 also calculates a score based on the comparison between the first traveling value and the second traveling value for each predetermined region, after which if the calculated score or the sum of calculated scores (referred to above as the total score) is equal to or larger than a threshold, the information processing apparatus 10 infers the region as the automatic driving difficult location. In a case in which, for example, the first traveling value and second traveling value indicate the number of accelerations and decelerations, if the difference is equal to larger than the threshold in the region, indicating that the second vehicle 30, which is an automatic vehicle, repeats unnecessary deceleration. Therefore, it is found that the location is an automatic driving difficult location, in which a human does not feel difficulty in manual driving but automatic driving is difficult. Accordingly, the information processing apparatus 10 can infer an automatic driving difficult location from the result of a comparison between the first traveling value and the second traveling value.

Next, the information processing apparatus 10 creates automatic driving difficult location information that indicates the automatic driving difficult location inferred in S122 (S123). When the information processing apparatus 10 calculates a score based on a comparison between the first traveling value and the second traveling value, the information processing apparatus 10 may create an automatic driving difficult location report that indicates an automatic driving difficult location inferred by the inferer 1022 from the score as automatic driving difficult location information, as described above with reference to, for example, FIG. 8.

Effects

As described above, according to this embodiment, an automatic driving difficult location in which travel of an automatically operated vehicle is difficult can be inferred by collecting both automatic driving information and manual driving information and making a comparison, for each predetermined region or the like, between the first traveling value calculated from the manual driving information and the second traveling value calculated from the automatic driving information. When a score based on a comparison between the first traveling value and the second traveling value or the sum of scores is used, it is possible to quantify an automatic driving difficult location that is difficult for a human to identify, that is, to represent such a location as a numeral. As described above, the automatic driving difficult location is, for example, a location in which a traffic sign, an obstacle, a lane, or another object that may be incorrectly recognized by an automatic vehicle is present or a location yet to be updated on the map. That is, the automatic driving difficult location is a problematic location specific to automatic driving in which a human does not feel difficulty in manual driving but travel of an automatic vehicle is difficult.

In addition, the information processing apparatus 10 according to this embodiment may output, to map information used in automatic driving, automatic driving difficult location information that includes information indicating a location that is not indicated in the map information but may become an automatic driving difficult location. Accordingly, a location yet to be updated on the map can be identified from the automatic driving difficult location information, so it is possible to update the map information so as to eliminate the location, on the map, that has not been updated. Thus, automatic driving difficult location information can be used to determine a timing at which to update the map information.

Although map information used in automatic driving needs to be continuously updated, a method by which all areas included in the map information are periodically updated is inefficient. When automatic driving difficult location information as described above is used, however, a specific area including an inferred automatic driving difficult location can be determined to be an area for which map information needs to be updated. As a result, the map information can be efficiently updated by, for example, updating the map information corresponding to the identified area or promoting the map maker to update the map information.

According to this embodiment, when the first traveling value is compared with the second traveling value for each road on which a manual vehicle (first vehicle) and an automatic vehicle (second vehicle) have traveled, each predetermined distance on the road, or each predetermined area on the road, it is possible to infer the automatic driving difficult location for each road, each predetermined distance on the road, or each predetermined area on the road.

According to this embodiment, the first traveling value is compared with the second traveling value under a condition that is at least one of time, a weather condition, and the age of the driver of a manual vehicle for each road on which both a manual vehicle (first vehicle) and an automatic vehicle (second vehicle) have traveled, each predetermined distance on the road, or each predetermined area on the road, it is possible to infer the automatic driving difficult location for each road, each predetermined distance on the road, or each predetermined area on the road.

As described above, it is possible to implement an information processing method, an information processing apparatus, and an information processing system that can infer an automatic driving difficult location that is difficult for a human to identify and can output information indicating the inferred automatic driving difficult location.

Other Variations

So far, the information processing method, information processing apparatus, and information processing system in one or a plurality of aspects of the present disclosure have been described. However, the present disclosure is not limited to this embodiment. The range of one or a plurality of aspects of the present disclosure may include embodiments in which various variations that a person having ordinary skill in the art thinks of are applied to this embodiment and may also include embodiments in which constituent elements in different embodiments are combined, without departing from the intended scope of the present disclosure. For example, the following cases are also included in the present disclosure.

(1) Each apparatus described above is specifically a computer system including a microprocessor, a read-only memory (ROM), a random-access memory (RAM), a hard disk unit, a display unit, a keyboard, a mouse, and the like. A computer program is stored in the RAM or hard disk unit in advance. When the microprocessor operates according to the computer program, each apparatus implements its functions. The computer program is a combination of a plurality of instruction codes that issue commands to the computer to achieve prescribed functions.

(2) Part or all of the constituent elements of each apparatus described above may be formed in the form of a single system large-scale integration (LSI) circuit. A system LSI circuit is a super multi-function LSI circuit manufactured by combining a plurality of constituent elements on a single chip. Specifically, a system LSI is a computer system that includes a microprocessor, a ROM, a RAM, and other components. A computer program is stored in the RAM. When the microprocessor operates as commanded by the computer program, the system LSI circuit achieves its functions.

(3) Part or all of the constituent elements of each apparatus described above may be formed in the form of an IC card or standalone module attachable to and detachable from each apparatus. The IC card or standalone module is a computer system that includes a microprocessor, a ROM, a RAM, and other components. The IC card or standalone module may include the super multi-function LSI circuit described above. When the microprocessor operates as commanded by a computer program, the IC card or standalone module achieves its functions. The IC card or standalone module may be tamper resistant.

(4) The present disclosure may be the method described above. Alternatively, the present disclosure may be a storage medium recording a computer program that causes a computer to implement the method or may be digital signals in the form of the computer program described above. A program according to an aspect of the present disclosure is, for example, a program that causes a computer to execute; an acquisition step of acquiring manual driving information that includes a history of driving data for one or more first vehicles that have been manually driven from the one or more first vehicles and also acquiring automatic driving information that includes a history of driving data for one or more second vehicles that have been automatically driven from the one or more second vehicles; a creation step of creating automatic driving difficult location information that indicates an automatic driving difficult location in which travel of an automatically driven vehicle is difficult from the result of a comparison between a first traveling value related to travel of the one or more first vehicles, the first traveling value being calculated from the manual driving information and a second traveling value related to travel of the one or more second vehicles, the second traveling value being calculated from the automatic driving information; and an output step of outputting the created automatic driving difficult location information.

Alternatively, the present disclosure may be a computer-readable storage medium, such as, for example, a flexible disk, a hard disk, a CD-ROM, a magneto-optical (MO) disk, a digital versatile disc (DVD), a DVD-ROM, a DVD-RAM, a Blu-ray (registered trademark) disc (BD), a semiconductor memory, or the like, on which the computer program or digital signals are recorded. Alternatively, the present disclosure may be the digital signals recorded in the storage medium.

Alternatively, the present disclosure may transmit the computer program or digital signals through a telecommunication line, wireless communication, a wired communication line, a network typified by the Internet, data broadcasting, or the like.

Alternatively, the present disclosure may be a computer system including a microprocessor and a memory. The memory may have stored the computer program. The microprocessor may operate as commanded by the computer program.

Alternatively, the present disclosure may be practiced by another independent computer system to which the storage medium in which the program or digital signals are recorded is transferred or to which the program or digital signals are transferred through the network or the like.

(5) The above embodiments may be combined.

(6) The present disclosure can be applied to, for example, an information processing method, an information processing apparatus, an information processing system, and a program that are used to update a map employed in automatic driving and to improve an environment in which an automatic vehicle travels so that the automatic vehicle adapts to, for example, an object that is incorrectly detected by a sensing device mounted on an automatic vehicle.

What is claimed is:

1. An information processing method executed by a computer, the method comprising:
    performing, a driving operation in a manual mode of a first vehicle, the driving operation includes at least steering of a steering wheel, operation of blinkers, and operation of an accelerator pedal and a brake pedal;
    (A) acquiring, from the first vehicle and while the first vehicle is performing the driving operation via a first plurality of sensors, manual driving information corresponding to the driving operation of the first vehicle that includes a history of manual driving data for the first vehicle, wherein the manual driving information includes data on the steering of steering of the steering wheel, the operation of the blinkers, and the operation of the accelerator pedal and the brake pedal;
    performing, the driving operation in an automatic mode of a second vehicle, the second vehicle being different from the first vehicle;
    (B) acquiring, from the second vehicle and while the second vehicle is performing the driving operation via a second plurality of sensors, automatic driving information relating to the driving operation of the second vehicle that includes a history of automatic driving data for the second vehicle, wherein the automatic driving information includes data on the steering of steering of the steering wheel, the operation of the blinkers, and the operation of the accelerator pedal and the brake pedal;
    (C) calculating, for each area, first values of a plurality of first driving parameters correlated with a degree of difficulty in driving according to the manual driving information, each of the first values including a first mean value per unit distance of the manual driving data corresponding to a first driving parameter, wherein the first driving parameters correlated with the degree of difficulty in driving according to the manual driving information includes a number of accelerations and decelerations, a number of lane changes, and an intra-lane traveling position;
    (D) calculating, for the each area, second values of a plurality of second driving parameters according to the automatic driving information, each of the second values including a second mean value per unit distance of the automatic driving data corresponding to a second driving parameter, wherein the second driving parameters correlated with the degree of difficulty in driving according to the automatic driving information includes a number of accelerations and decelerations, a number of lane changes, and an intra-lane traveling position;
    (E) comparing the first values with the second values for the each area to determine at least one difficult area in which travel of a vehicle by automatic driving is more difficult than manual driving when an aggregation of differences between the first values and the second values is above a predetermined threshold, the first values indicating a number of changes to vehicle movement operation and the intra-lane traveling position per unit distance while in an autonomous driving mode for a respective area, and the second values indicating a number of changes to vehicle movement operation and the intra-lane traveling position per unit distance while in a manual driving mode for the respective area;
    (F) creating difficult area information that indicates the difficult area that is more difficult to drive by the automatic driving, the difficult area information including a first position of a traffic sign, a second position of an obstacle on the road, and a third position of a geographic lane location that are determined to be incorrectly detected based on a reference automatic driving map; and
    (G) displaying, via a display, the difficult area as a graphic icon on a map and a report relating to the first values and the second values,
    wherein the difficult area is determined based on the number of changes to vehicle movement operation and the intra-lane traveling position per unit distance while in the autonomous driving mode, and wherein the difficult area displayed as the graphic icon on the map is subsequently removed when the aggregation of differences between the first values and the second values falls below the predetermined threshold.

2. The information processing method according to claim 1, wherein the manual driving information includes, for each area where the first vehicles have traveled, a number of accelerations and decelerations performed by the each of the first vehicles, the number of lane changes made by the each of the first vehicles, and an intra-lane traveling position, relative to a center of a lane, of the each of the first vehicles during driving.

3. The information processing method according to claim 1, wherein the automatic driving information includes, for each area where the second vehicles have traveled, a number of accelerations and decelerations performed by the each of the second vehicles, the number of lane changes made by the each of the second vehicles, and an intra-lane traveling position, relative to a center of a lane, of the each of the second vehicles during driving.

4. The information processing method according to claim 1, wherein the (E) includes:

calculating, for the each area, a difference between the first value and the second value; and determining an area for which the difference is equal to or larger than a predetermined value as the difficult area.

5. The information processing method according to claim 1, further comprising:
(C') calculating, for the each area, a third value of another driving parameter that is correlated with a degree of difficulty in driving according to the manual driving information; and
(D') calculating, for the each area, a fourth value of the another driving parameter according to the automatic driving information; wherein
the (E) includes:
(E1) calculating, for the each area, a first difference between the first value and the second value;
(E2) determining, for the each area, a first score according to the first difference;
(E3) calculating, for the each area, a second difference between the third value and the fourth value;
(E4) determining, for the each area, a second score according to the second difference;
(E5) determining, for the each area, a total score from a plurality of scores including the first score and the second score; and
(E6) determining an area for which the total score is equal to or larger than a predetermined value as the at least one difficult area.

6. The information processing method according to claim 1, wherein the each area is one of a plurality of areas into which a map is divided for each road, for each section of the each road, or for each longitude and each latitude.

7. The information processing method according to claim 1, further comprising
(H) acquiring condition information that indicates a weather, a driver, and/or a time zone in which the first vehicles have traveled, wherein
the (E) includes:
comparing the first value acquired under a first condition with the second value acquired under a second condition same as or similar to the first condition, based on the condition information.

8. The information processing method according to claim 1, wherein the (F) includes:
(F1) acquiring situation information that indicates a road situation in the difficult area from the first vehicles, the second vehicles, and/or a monitoring system installed on roads;
(F2) comparing the situation information with map information that indicates an area, corresponding to the difficult area, of map data referenced when the second vehicles travel by auto driving, wherein the map information corresponds to information that is displayed on a map; and
(F3) creating update information for updating the map information of the map data according to a comparison result, and the difficult area information includes the update information.

9. The information processing method according to claim 8, wherein the situation information includes a traffic sign, an obstacle, and/or information indicating a position of the lane in the difficult area.

10. An information processing apparatus comprising:
a processor; and
a memory in which a program is recorded, the program causing the processor to execute the information processing method according to claim 1.

11. A system comprising:
the information processing apparatus according to claim 10;
the first vehicle; and
the second vehicle.

12. A storage medium in which a program is recorded in a non-transitory manner, the program causing a computer to execute the information processing method according to claim 1.

13. The information processing method according to claim 1, wherein the difficult area information further includes an incomplete location on a map used in the autonomous driving mode.

* * * * *